United States Patent
Miyazaki et al.

(10) Patent No.: US 9,975,313 B2
(45) Date of Patent: May 22, 2018

(54) DECORATIVE SHEET AND DECORATIVE METAL PLATE USING SAME

(71) Applicant: DAI NIPPON PRINTING CO., LTD., Tokyo (JP)

(72) Inventors: Saori Miyazaki, Tokyo (JP); Takeshi Kobayashi, Tokyo (JP); Hitoshi Nishikawa, Tokyo (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 305 days.

(21) Appl. No.: 14/344,657

(22) PCT Filed: Sep. 28, 2012

(86) PCT No.: PCT/JP2012/075179
§ 371 (c)(1),
(2) Date: Mar. 13, 2014

(87) PCT Pub. No.: WO2013/047797
PCT Pub. Date: Apr. 4, 2013

(65) Prior Publication Data
US 2014/0349096 A1 Nov. 27, 2014

(30) Foreign Application Priority Data

Sep. 30, 2011 (JP) .................................. 2011-218428

(51) Int. Cl.
*B32B 7/02* (2006.01)
*B32B 27/40* (2006.01)
(Continued)

(52) U.S. Cl.
CPC ................. *B32B 7/02* (2013.01); *B32B 7/12* (2013.01); *B32B 15/04* (2013.01); *B32B 27/308* (2013.01);
(Continued)

(58) Field of Classification Search
CPC .. B32B 7/02; B32B 7/12; B32B 15/04; B32B 27/36; B32B 27/308; B32B 27/40;
(Continued)

(56) References Cited

U.S. PATENT DOCUMENTS

2009/0111904 A1* 4/2009 Odaka ................ C08G 18/4277
522/96

FOREIGN PATENT DOCUMENTS

JP  2000-326443 A  11/2000
JP  2006137780 A * 6/2006
(Continued)

OTHER PUBLICATIONS

Machine translation of JP2009096186. Retrieved Jan. 22, 2016.*
(Continued)

*Primary Examiner* — Prashant J Khatri
(74) *Attorney, Agent, or Firm* — Fitch, Even, Tabin & Flannery, LLP

(57) ABSTRACT

A decorative sheet (1) pertaining to the present invention comprises a base material (2), a colored ink layer (3), a primer layer (4), and a surface-protecting layer (5) in this order, wherein the base material (2) comprises a polyester-based film wherein a thickness of the base material (2) is 20 μm or more but 95 μm or less; the surface-protecting layer (5) comprises a cured product of an ionizing radiation-curable resin composition wherein elongation of the cured product according to JIS K6732 is 1% or more; and elongation of the decorative sheet according to JIS K6732 is 30% or more but 180% or less. This enables all of secondary workability, weather resistance, and fire resistance to be enhanced.

12 Claims, 1 Drawing Sheet

(51) Int. Cl.
- *C09D 175/06* (2006.01)
- *C08K 5/00* (2006.01)
- *B32B 27/36* (2006.01)
- *B32B 7/12* (2006.01)
- *B32B 15/04* (2006.01)
- *B32B 27/30* (2006.01)
- *E04F 13/08* (2006.01)

(52) U.S. Cl.
CPC ............ *B32B 27/36* (2013.01); *B32B 27/365* (2013.01); *B32B 27/40* (2013.01); *C08K 5/005* (2013.01); *C09D 175/06* (2013.01); *B32B 2250/04* (2013.01); *B32B 2250/05* (2013.01); *B32B 2307/518* (2013.01); *B32B 2607/00* (2013.01); *E04F 13/08* (2013.01); *Y10T 428/24975* (2015.01); *Y10T 428/266* (2015.01)

(58) Field of Classification Search
CPC ..... B32B 27/365; E04F 13/08; C09D 175/06; C08K 5/005
See application file for complete search history.

(56) References Cited

FOREIGN PATENT DOCUMENTS

| | | |
|---|---|---|
| JP | 2007-290382 A | 11/2007 |
| JP | 2008-105372 A | 5/2008 |
| JP | 2008-238444 A | 10/2008 |
| JP | 2009-096184 | 5/2009 |
| JP | 2009-96186 A | 5/2009 |
| JP | 2009-255501 A | 11/2009 |
| JP | 2010-082810 A | 4/2010 |
| JP | 2010-082821 | 4/2010 |

OTHER PUBLICATIONS

"Crosslinking Technology for Fast-Curing, High-Performance, Low-VOC Coatings". Paint & Coatings Industry. http://www.pcimag.com/articles/86518-crosslinking-technology-for-fast-curing-high-performance-low-voc-coatings, (2001); pp. 1-8.*
Machine translation of JP2006137780. Retrieved Apr. 5, 2017.*
EP Search Report of Appln. No. 12836747.1 dated Apr. 29, 2015 in English.
Office Action of JP Appln. No. 2013-536450 dated Jan. 5, 2016.

* cited by examiner

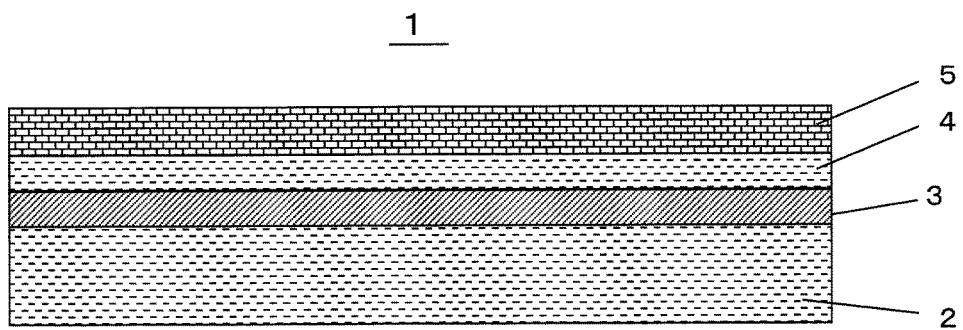

DECORATIVE SHEET AND DECORATIVE METAL PLATE USING SAME

TECHNICAL FIELD

The present invention relates to a decorative sheet comprising a base material, a colored ink layer, a primer layer, and a surface-protecting layer in this order and to a decorative metal plate using this decorative sheet.

BACKGROUND ART

Up to now, a decorative sheet has been used in order to provide a metal plate with a design such as a pattern, figure, and the like. On the decorative sheet is formed a design such as a pattern, a figure, and the like by means of printing and the like, and the sheet is used by being pasted on the metal plate. A metal plate having a decorative sheet pasted thereon is referred to as a decorative metal plate.

As an example of the decorative sheet, there may be mentioned one comprising a surface-protecting layer comprising a polyvinyl chloride resin, which is thermally laminated on a base material comprising a polyvinyl chloride resin with a pictorial pattern layer interposed therebetween, the pictorial pattern layer comprising a vinyl chloroacetate-acrylic-based resin as a binder.

Furthermore, there has been proposed a decorative sheet which is formed from, instead of a polyvinyl chloride resin, a polyolefin resin containing no chlorinated material (see Patent Literature 1). Even though the polyvinyl chloride resin has an advantage that it is inexpensive and versatile, it has a high environmental load and has a problem in weather resistance because it tends to deteriorate by ultraviolet light. Thus, a decorative sheet using a polyolefin resin and the like, which contains no chlorinated material, is becoming appreciated.

The decorative metal sheet is used as interior and exterior materials for buildings, structures, and the like, usually after being subjected to secondary working such as bending, punching, cutting, and the like. When the decorative metal sheet is bent, there occur, in some cases, cracking and whitening of the surface design at the bent portion because, thereat, the base material, the surface protecting layer, and the like which constitute the decorative sheet are subjected to a stress. Also, when punching work and cutting work are performed on a decorative metal sheet, there are cases where the decorative sheet stretches and is not fractured properly. The tendency of being unable to follow the desired bending work or of being difficult to be cut off at the time of punching work and cutting work, as seen above, has been pronounced in a decorative sheet comprising, among the above-mentioned polyolefin resins, a polypropylene resin as a main material. In response to this, there has been proposed a decorative sheet comprising a polyester resin as a main material (Patent Literature 2).

Meanwhile, with expansion of application areas of the decorative sheet in recent years, there are desired further enhancement of designability, workability appropriate to the application area, and properties appropriate to the application area. For example, when the decorative metal plate is applied as an exterior material for structures and buildings, it is exposed to sunlight and weather and, therefore, it is required to exhibit not only secondary workability but also an especially higher level of weather resistance than when it is used as an interior material.

The decorative sheet comprising a polypropylene resin as a main material has better weather resistance than the decorative sheet comprising a polyester resin as a main material. However, as mentioned above, the decorative sheet comprising a polypropylene resin as a main material requires a certain degree of thickness to prevent sagging during production as well as thermal shrinkage and wrinkling due to drying. When thickness of the decorative sheet increases, the amount of organic matter increases and, thus, there have been cases where fire resistance thereof deteriorated.

Furthermore, the decorative sheet comprising a polyester resin as a main material, even when it is thin, has better bending workability than the decorative sheet comprising a polypropylene resin as a main material and therefore, from a viewpoint of fire resistance, is superior to the decorative sheet comprising a polypropylene resin as a main material. However, the decorative sheet comprising a polyester resin as a main material is inferior in weather resistance to the decorative sheet comprising a polypropylene resin as a main material and therefore, in order to satisfy the desired weather resistance, it is necessary to provide the former with a coating layer and the like. This has also been a cause to invite increase in the production cost of the former.

As seen above, there has been room for further improvement in order to satisfy the three conflicting performances of the decorative sheet simultaneously at a high level, the three performances including secondary workability, weather resistance, and fire resistance.

BACKGROUND ART

Patent Literature

Patent Literature 1: Japanese Patent Laid-Open Publication No. 2000-326443
Patent Literature 2: Japanese Patent Laid-Open Publication No. 2007-290382

SUMMARY OF THE INVENTION

Problems to be Solved by the Invention

The object of the present invention is to provide a decorative sheet which can improve all of secondary workability, weather resistance, and fire resistance, and to provide a decorative metal plate comprising the decorative sheet.

Means for Solving the Problems

The present inventors conducted diligent research in order to attain the object and, as a result, found that the problems can be solved by setting the thickness of the base material, elongation of the surface-protecting layer, and elongation of the decorative sheet to specific values.

That is, the present invention provides:

[1] A decorative sheet comprising a base material, a colored ink layer, a primer layer, and a surface-protecting layer in this order, wherein the base material comprises a polyester-based film wherein a thickness of the base material is 20 am or more but 95 am or less; the surface-protecting layer comprises a cured product of an ionizing radiation-curable resin composition wherein elongation of the cured product according to JIS K6732 is 1% or more; and elongation of the decorative sheet according to JIS K6732 is 30% or more but 180% or less;

[2] The decorative sheet according to [1] above, wherein the base material comprises biaxially stretched polyethylene terephthalate;

[3] The decorative sheet according to [1] or [2] above, wherein the surface-protecting layer is an ionizing radiation-curable resin composition containing a urethane (meth) acrylate as an ionizing radiation-curable resin;

[4] The decorative sheet according to [1] to [3] above, wherein the surface-protecting layer contains at least either one of a triazine-based ultraviolet absorber and a light stabilizer;

[5] The decorative sheet according to [1] to [4] above, wherein the primer layer contains at least either one of a triazine-based ultraviolet absorber and a light stabilizer;

[6] The decorative sheet according to [1] to [5] above, wherein the primer layer contains a copolymer of a polycarbonate-based urethane resin and an acrylic resin; and

[7] A decorative metal plate comprising a metal plate, an adhesive layer disposed on a surface of the metal plate, and a decorative sheet in this order, the decorative sheet being pasted on the metal plate with the adhesive layer interposed therebetween.

Effect of the Invention

According to the decorative sheet of the present invention, all of secondary workability, weather resistance, and fire resistance can be enhanced.

BRIEF DESCRIPTION OF THE DRAWING

FIG. 1 is a cross-sectional view describing a decorative sheet shown as an embodiment of the present invention.

MODE FOR CARRYING OUT THE INVENTION

A decorative sheet pertaining to the present invention comprises a base material, a colored ink layer, a primer layer, and a surface-protecting layer in this order, wherein the base material comprises a polyester-based film wherein a thickness of the base material is 20 μm or more but 95 μm or less; the surface-protecting layer comprises a cured product of an ionizing radiation-curable resin composition wherein elongation of the cured product according to JIS K6732 is 1% or more; and elongation of the decorative sheet according to JIS K6732 is 30% or more but 180% or less.

[Decorative Sheet]

A typical structure of a decorative sheet 1 shown as an embodiment of the present invention will be described using FIG. 1. FIG. 1 is a cross-sectional view describing an example of a preferable embodiment of the decorative sheet 1.

The decorative sheet 1 comprises a base material 2, a colored ink layer 3, a primer layer 4, and a surface-protecting layer 5 in this order, the surface-protective layer being a cured product of an ionizing radiation-curable resin composition.

It is imperative that elongation of the decorative sheet 1 according to JIS K6732 is 30% or more but 180% or less, and is preferably 40% or more but 170% or less.

When the elongation of the decorative sheet 1 is less than 30%, stiffness is too high and cracking and whitening occur on the base material 2 or the surface-protecting layer 5 at the bent portion of the decorative sheet 1. When the elongation of the decorative sheet exceeds 180%, the base material 2 becomes easily elongated but the colored ink layer 3, the primer layer 4, and the surface-protecting layer 5 cannot follow deformation of the base material 2, resulting in occurrence of cracking and whitening.

Elongation includes both elongation in a direction of flow (referred to as the MD direction) and elongation in a direction (referred to as the CD direction) intersecting the direction of flow (the MD direction) at the time of production of the decorative sheet 1. That is, both elongation in the MD direction and elongation in the CD direction preferably satisfy the range of 30% or more but 180% or less.

[Base Material]

The base material 2 is required to comprise a polyester resin film from the viewpoints of weather resistance, fire resistance, secondary workability, and versatility. As the polyester resin film, there can be used one which is usually used in the field of decorative sheet.

Meanwhile, in the present embodiment, secondary working indicates a bending work, a punching work, and a cutting work, and the secondary workability means the ease of carrying out the bending work, the punching work, and the cutting work.

A polyester resin used for the polyester resin film refers to a polymer containing ester groups, obtained from a polybasic carboxylic acid and a polyhydric alcohol by polycondensation. As the polybasic carboxylic acid, there may be mentioned terephthalic acid, isophthalic acid, phthalic acid, 2,6-naphthalene dicarboxylic acid, adipic acid, sebacic acid, decane dicarboxylic acid, azelaic acid, dodecane dicarboxylic acid, cyclohexane dicarboxylic acid, and the like.

Furthermore, as the polyhydric alcohol, there may be mentioned ethylene glycol, propanediol, butanediol, pentanediol, hexanediol, neopentyl glycol, 1,4-cyclohexanedimethanol, decanediol, 2-ethyl-butyl-1-propanediol, bisphenol A, and the like. Further, the polyester resin used in the present invention may be a copolymer of three or more kinds of polybasic acids and polyhydric alcohols or may be a copolymer with a monomer and a polymer such as diethylene glycol, triethylene glycol, polyethylene glycol, and the like.

As an example of the polyester resin used for the polyester resin film, there can be preferably mentioned polyethylene terephthalate (PET), polybutylene terephthalate (PBT), polyethylene naphtahlate (PEN), and the like. Above all, in light of production cost, polyethylene terephthalate (PET) is preferable.

The base material 2 may be a monolayer film formed from one kind selected from the polyester resins or may be a multilayer film obtained by laminating a plurality of monolayer films formed from one kind selected from the polyester resins. Further, the base material 2 may be a multilayer film obtained by laminating a monolayer film formed from one kind selected from the polyester resins and a monolayer film formed from another kind of resin selected from the polyester resins. The polyester resin may be a homopolymer, a copolymer, or one having a third component copolymerized.

As the polyester resin, there can be used, in addition to various homopolymers, a copolymerized polyester-based resin to which various copolymerizable components or modifying components are added for the purpose of softening the resin and the like; a polyester-based thermoplastic elastomer; and the like. For example, in the case of PET, there can be introduced, as a dicarboxylic acid component in the condensation polymerization reaction of terephthalic acid and ethylene glycol, for example, a long-chain aliphatic dicarboxylic acid and/or a cycloaliphatic dicarboxylic acid such as sebacic acid, eicosanedioic acid, dodecanedioic acid, dimer acid, cyclohexane dicarboxylic acid, and the like. Also, as a diol component, there can be introduced a polyether-based diol having hydroxyl groups at both ends such as polyethylene glycol, polytetramethylene glycol, and the like.

In the present invention, the polyester resin film used as the base material 2 can be formed into a film by, for example, a calendar method, an inflation method, a T-die extrusion method, and the like. Furthermore, the polyester resin film used as the base material 2 is preferably a stretched film which was subjected to a stretching treatment in a uniaxial direction or a biaxial direction, and more preferably a biaxially stretched film. The stretching method may be either successive biaxial stretching or simultaneous biaxial stretching. In addition, if necessary, the film may be stretched in a longitudinal and/or transverse directions again before or after it is subjected to thermal fixing.

A stretch ratio of the polyester resin film is, as an area ratio, preferably 10 or less, more preferably 6 or less. Further, it is preferably not less than 3 and not more than 4. Within this range, when the polyester resin film obtained is used as the base material 2, good secondary workability and dimensional stability are obtained.

Fire resistance in the present invention is represented by Class A, Class B, or Class C based on values of Fire Spread Index (FSI) and Smoke Development Index (SDI) obtained by the Steiner tunnel fire test based on ASTM E-84. Specifically, the fire resistance is rated Class A when $FSI \leq 25$ and $SDI \leq 450$. Further, the fire resistance is rated Class B when $26 \leq FSI \leq 75$ and $SDI \leq 450$. The fire resistance is rated Class C when $76 \leq FSI \leq 200$ and $SDI \leq 450$. Meanwhile, in the present invention, the term "fire resistant" means that the material corresponds to Class A.

It is imperative that thickness of the base material 2 is 20 µm or more but 95 µm or less and is preferably 25 to 80 µm, more preferably 30 to 50 µm. When the thickness of the base material is less than 20 µm, fracturing of the base material 2 is caused and, when the thickness of the base material 2 exceeds 95 µm, the prescribed fire resistance is not obtained.

In the present invention, especially, the base material 2 preferably comprises biaxially stretched polyethylene terephthalate. By using biaxially stretched polyethylene terephthalate, mechanical strength of the base material 2 is enhanced.

To the polyester resin used as the base material 2, if necessary, an additive may be blended. As the additive, there may be mentioned a filler, a flame retardant, an antioxidant, a lubricating agent, a foaming agent, an ultraviolet absorber, a light stabilizer, and the like. As the ultraviolet absorber and the light stabilizer, there may be used the same ones as those which can be added to a resin composition which constitutes the surface-protecting layer 5 which will be described in detail later. The base material 2 may be colored. The colorant is not particularly limited and a heretofore known colorant such as a pigment, a dye, and the like can be used.

As an example of the colorant, there may be mentioned inorganic pigments such as titanium white, zinc oxide, red iron oxide, vermillion, ultramarine, cobalt blue, titanium yellow, chrome yellow, carbon black and the like; organic pigments (including dyes also) such as isoindolinone, hansa yellow A, quinacridone, permanent red 4R, phthalocyanine blue, induslene blue RS, aniline black, and the like; metallic pigments such as aluminum, brass, and the like; perlescent (pearl) pigments comprising foil powder such as titanium dioxide-coated mica, basic lead carbonate, and the like; and the like. Coloring of the base material 2 includes transparent coloring and opaque coloring (coloring to mask), and these can be selected arbitrarily. For example, when the ground color of an adherend (the metal plate to which the decorative sheet is adhered) is to be masked by coloring, the opaque coloring should be selected. On the other hand, when the ground pattern of the adherend is to be made visually observable, the transparent coloring should be selected.

In order to enhance adhesiveness with other layers, the base material 2, if desired, can be provided on one or both surfaces with a physical or chemical surface treatment such as by an oxidation method or a surface roughening method (hereinafter, referred to as an easy-adhesion treatment). In the embodiment of the present invention, it is preferable that at least one surface of the base material is provided with the easy-adhesion treatment.

In the present invention, the easy-adhesion coating treatment can suitably be used as the chemical surface treatment. The easy-adhesion coating treatment is a treatment which improves the adhesive property by coating a resin layer and the like on the base material 2. As the resin used for this, there can be suitably selected one or a combination of a plurality from polyester resins, acrylic resins, and urethane resins.

As the oxidation method, there may be mentioned, for example, a corona discharge treatment, a chrome oxidation treatment, a flame treatment, a hot-air treatment, an ozone/ultraviolet treatment, and the like. As the surface roughening method, there may be mentioned, for example, a sandblast method, a solvent treatment method, and the like. The surface treatment method is suitably selected from these depending on the kind of the base material 2.

[Colored Ink Layer]

The colored ink layer 3 is formed between the base material 2 and the primer layer 4. The colored ink layer 3 comprises at least one of a pictorial pattern layer and a color masking layer.

<Pictorial Pattern Layer>

The pictorial pattern layer provides the decorative sheet and the decorative metal plate with a design by means of a desired pictorial pattern, and the kind and the like of the pictorial pattern are not particularly limited. For example, there may be mentioned a wood grain figure, a stone grain figure, a sand figure, a tile figure, a brickwork figure, a cloth figure, a leather figure, a geometric figure, a letter, a symbol, an abstract figure, and the like.

The pictorial pattern layer is formed by printing various figures by using inks and a printing machine. It is formed by polychrome printing with process colors of yellow, red, blue, and black and, in addition, it is also formed by polychrome printing and the like with spot colors, the polychrome printing being performed by preparing blocks of individual colors which constitute the figure. As the ink used for the pictorial pattern layer, there is used one obtained by suitably mixing a binder with a colorant such as a pigment, a dye, and the like; a body pigment; a solvent; a stabilizer; a plasticizer; a catalyst; a hardener; and the like.

The binder is not particularly limited. For example, there may be mentioned a polyurethane resin, an acrylic resin, a polyester resin, a polyamide resin, a butyral resin, a polystyrene resin, a vinyl chloride-vinyl acetate copolymer resin, a vinyl chloride-vinyl acetate-acrylic copolymer resin, a chlorinated polypropylene resin, a nitrocellulose resin, a cellulose acetate resin, and the like. These may be used singly or in a combination of two or more.

The colorant may be selected suitably from the viewpoints of intended use of the decorative sheet, compatibility of the color with the color masking layer, and the like. For example, there may be mentioned inorganic pigments such as carbon black (sumi), iron black, titanium white, antimony white, chrome yellow, titanium yellow, red iron oxide, cadmium red, ultramarine, cobalt blue, and the like; organic pigments or dyes such as quinacridone red, isoindolinone yellow, phthalocyanine blue, and the like; metallic pigments comprising scale-like foil powder of aluminum, brass, and the like; perlescent (pearl) pigments comprising scale-like foil powder such as titanium dioxide-coated mica, basic lead carbonate, and the like; and the like.

<Color Masking Layer>

The color masking layer is provided for the purpose of upgrading designability of the decorative sheet 1 and of enhancing interlayer adhesiveness between the base material 2 and the pictorial pattern layer.

The color masking layer is provided when a surface of a metal plate which forms the decorative metal plate is colored, when there are color irregularities on the surface of the metal plate, or the like, and it can adjust the tint of the surface of the metal plate and express the intended color. The color masking layer is usually formed by an opaque color for the purpose of masking the metal plate or an undercoat but it may be formed by a colored transparent color to make the most of the figures the base material and undercoat have. As the ink used for forming the color masking layer, there can be used the same one as that used for formation of the above-mentioned pictorial pattern layer. A thickness of the color masking layer is preferably 0.5 to 20 µm, more preferably 1 to 10 µm, and even more preferably 1 to 6 µm. When the thickness is in the above range, the effect of installing the color masking layer is sufficiently obtained.

[Primer Layer]

As the primer layer 4, there can be used a resin material which is usually used as a primer layer of a decorative sheet. As a specific example of a thermosetting resin which forms the primer layer 4, it is preferable to use a polycarbonate-based urethane-acrylic copolymer, a polyester-based urethane-acrylic copolymer, or a resin comprising a polycarbonate-based urethane-acrylic copolymer and an acrylic polyol; and, more preferably a polycarbonate-based urethane-acrylic copolymer.

By forming the primer layer 4 using these resins, there is obtained a primer layer provided with a stress relaxation property and having excellent weather resistance.

The polycarbonate-based urethane-acrylic copolymer is a resin obtained by radically polymerizing an acrylic monomer using a polycarbonate-based polyurethane polymer as a radical polymerization initiator, the polyurethane polymer being obtained by reacting a polycarbonate diol and a diisocyanate.

As the diisocyanate used as a hardener, there may be mentioned various aliphatic (or alicyclic) or aromatic diisocyanates which are heretofore known in the field of polyurethane.

Here, as the diisocyanate, there may be preferably mentioned aliphatic isocyanates such as hexamethylene diisocyanate and the like; and alicyclic isocyanates such as isophorone diisocyanate, hydrogenated xylylene diisocyanate, and the like. As the acrylic monomer, there may be preferably mentioned (meth)acrylic acid and a (meth)acrylic alkyl ester having an alkyl group having about 1 to 6 carbon atoms, and these may be used singly or in a combination of two or more kinds.

The diisocyanate used as a hardener is preferably contained in an amount of 1 to 30 parts by mass relative to 100 parts by mass of the above-mentioned thermosetting resin.

The primer layer 4 may contain a colorant. The colorant is not particularly limited and there may be mentioned the same ones as those which can be used for coloring of the base material 2, and carbon black and the like. Among these colorants, inorganic pigments such as titanium white (titanium oxide) and the like are preferable. These inorganic pigments have a high masking effect for the undercoat and also an effect to cut ultraviolet light. Furthermore, these have an effect to prevent blocking of the decorative sheet during a production process thereof.

Silica can be used as the inorganic pigment. When silica is used, preferable is spherical silica, the particle shape of which is globular. The particle diameter of the spherical silica is preferably about 1 to 10 µm and, in order to improve transparency, the particle diameter is more preferably about 1 to 4 µm. As for the kind of such spherical silica, heretofore known ones, whether treated or untreated, can be used and these can be used singly or as a mixture of two or more kinds.

Further, the blending amount of silica is preferably 5 to 25 parts by mass relative to 100 parts by mass of a resin content which forms the primer layer 4. By blending the spherical silica having such a particle diameter in the aforementioned blending amount, specularity and transparency of the primer layer can be secured while maintaining the coating performance.

Thickness of the primer layer is not particularly limited but is preferably in a range of 0.5 to 10 µM from the viewpoint of relaxing stress exerted on the surface-protecting layer 5 at the time of bending work among secondary working or of suppressing blocking during the production process of the decorative sheet and at the same time obtaining sufficient adhesiveness. Further, the thickness of the primer layer 4 is preferably in a range of 1 to 5 µm. Also, the coating amount of a resin composition which forms the primer layer is in a range of 0.5 to 10 g/m$^2$, more preferably in a range of 1 to 5 g/m$^2$.

<Additive>

In the embodiment of the present invention, various additives can be blended into the primer layer 4. The additives include, for example, a weather resistance improver, an abrasion resistance enhancer, a polymerization inhibitor, a cross-linking agent, an infrared absorber, an antistatic agent, an adhesion enhancer, a levelling agent, a thixotropy-imparting agent, a coupling agent, a plasticizer, an antifoaming agent, a filler, a solvent, a colorant, and the like.

(Weather Resistance Improver)

As the weather resistance improver, the primer layer 4 preferably contains at least either one of an ultraviolet absorber and a light stabilizer.

Weather resistance includes resistance of the primer layer 4 against degradation and peel-off caused by ultraviolet light and the like, as well as resistance of the colored ink layer 3 and the base material 2 against degradation and discoloration caused by ultraviolet light and the like. The weather resistance improver is suitable for enhancing both of these effects.

The ultraviolet absorber may be either inorganic-based or organic-based. As the inorganic-based ultraviolet absorber, there can be preferably used titanium oxide, cerium oxide, zinc oxide, and the like having an average particle diameter of about 5 to 120 nm. Further, as the organic-based ultraviolet absorber, there can be preferably mentioned, for example, a benzotriazole-based absorber, a triazine-based absorber, a benzophenone-based absorber, a salicylate-based absorber, an acrylonitrile-based absorber, and the like. Above all, more preferable is the triazine-based absorber, which has a high ultraviolet absorbing ability and does not degrade easily even by high energy such as ultraviolet light and the like.

As the triazine-based ultraviolet absorber, there may be mentioned hydroxyphenyltrizine-based ultraviolet absorbers including 2-(2-hydroxy-4-[1-octyloxycarbonylethoxy]phenyl)-4,6-bis(4-phenylphenyl)-1,3,5-triazine (trade name "TINUVIN 479," produced by BASF), a reaction product (trade name "TINUVIN 400," produced by BASF) of 2-(4, 6-bis(2,4-dimethylphenyl)-1,3,5-triazine-2-yl)-5-hydroxyphenyl and an oxirane {especially, [($C_{10}$-$C_{16}$, mainly $C_{12}$-$C_{13}$ alkyloxy)methyl]oxirane}, a reaction product (trade name "TINUVIN 405," produced by BASF) of 2-(2,4-dihydroxyphenyl)-4,6-bis(2,4-dimethylphenyl)-1,3,5-triazine and (2-ethylhexyl) glycidate, 2,4-bis[2-hydroxy-4-butoxyphenyl]-6-(2,4-dibutoxylphenyl)-1,3,5-triazine (trade name "TINUVIN 460," produced by BASF), and the like. Furthermore, as the ultraviolet absorber, there can also be used an ultraviolet absorber having an electron beam reactive group within the molecule.

As the triazole-based ultraviolet absorber, there can be specifically mentioned 2-(2-hydroxy-5-methylphenyl)benzotriazole, 2-(2-hydroxy-3,5-di-tert-amylphenyl)benzotriazole, a 3-[3-(benzotriazol-2-yl)-5-tert-butyl-4-hydroxyphenyl]propionic acid ester of polyethylene glycol, and the like.

Especially, when a triazine-based ultraviolet absorber is used, its content relative to 100 parts by mass of a resin content which forms the primer layer 4 is preferably 0.1 to 50 parts by mass, more preferably 1 to 40 parts by mass, and even more preferably 10 to 35 parts by mass.

(Light Stabilizer)

As the light stabilizer, there may be preferably mentioned a hindered amine-based light stabilizer (HALS) and the like. Furthermore, there can be used a light stabilizer having a (meth)acryloyl group, which is an electron beam reactive group, within the molecule.

As specific examples of the hindered amine-based light stabilizer, there may be mentioned bis(1,2,2,6,6-pentamethyl-4-piperidyl) sebacate (trade name "TINUVIN 292," produced by BASF), bis(2,2,6,6-tetramethyl-1-(octyloxy)-4-piperidinyl) decanedioate, a reaction product of 1,1-dimethylethyl hydroperoxide and octane (trade name "TINUVIN 123," produced by BASF), bis(1,2,2,6,6-pentamethyl-4-piperidinyl) sebacate, methyl(1,2,2,6,6-pentamethyl-4-piperidinyl) sebacate, 2,4-bis[N-butyl-N-(1-cyclohexyloxy-2,2,6,6-tetramethylpiperidin-4-yl)amino]-6-(2-hydroxyethylamine)-1,3,5-triazine, and the like.

Further, there may be mentioned electron beam reactive hindered amine-based ultraviolet absorbers such as 1,2,2,6, 6-pentamethyl-4-piperidinyl methacrylate (trade name, "Sanol LS-3410," produced by BASF), pentamethylpiperidyl methacrylate (trade name "FA-71 IMM," produced by Hitachi Chemical Co., Ltd.), 2,2,6,6-tetramethyl-4-piperidinyl methacrylate (trade name "FA-712 HMJ," produced by Hitachi Chemical Co., Ltd.), and the like.

When a hindered amine-based light stabilizer is used, its content relative to 100 parts by mass of the resin content which forms the primer layer 4 is 0.05 to 15 parts by mass, more preferably 0.5 to 12 parts by mass, even more preferably 1 to 10 parts by mass, and especially preferably 3 to 10 parts by mass.

<Method of Forming Primer Layer>

The primer layer 4 can be formed by coating a composition containing a resin which forms the primer layer 4, as is or in a state of being dissolved or dispersed in a solvent, on the colored ink layer 3 by a heretofore known printing method, coating method, or the like, followed by drying and curing.

[Surface-Protecting Layer]

The surface-protecting layer 5 is a cured product of an ionizing radiation-curable resin composition. The ionizing radiation-curable resin composition is a resin composition which is cross-kinked and cured by irradiation of ultraviolet light or an electron beam which, among electromagnetic waves and charged particle beams, has energy quanta which can cross-link and polymerize molecules. Specifically, there can be used a resin composition suitably selected from polymerizable monomers and polymerizable oligomers or prepolymers which are commonly used as the ionizing radiation-curable resin composition.

Representatively, as the polymerizable monomer, suitable are (meth)acrylate-based monomers having radically polymerizable unsaturated groups in the molecule and, above all, preferable are polyfunctional (meth)acrylates. Here, "(meth) acrylate" means "acrylate or methacrylate." The polyfunctional (meth)acrylate should be a (meth)acrylate having two or more ethylenic unsaturated bonds within the molecule and is not particularly limited.

In the present invention, a monofunctional (meth)acrylate may be suitably used together with the polyfunctional (meth)acrylate for a purpose of lowering the viscosity thereof and the like, insofar as the object of the present invention is not impaired. As the monofunctional (meth) acrylate, there may be mentioned, for example, methyl (meth)acrylate, ethyl (meth)acrylate, propyl (meth)acrylate, butyl (meth)acrylate, pentyl (meth)acrylate, hexyl (meth) acrylate, cyclohexyl (meth)acrylate, 2-ethylhexyl (meth) acrylate, lauryl (meth)acrylate, stearyl (meth)acrylate, isobornyl (meth)acrylate, and the like. These monofunctional (meth)acrylates may be used singly or in a combination of two or more kinds.

As the polymerizable oligomer, there may be mentioned an oligomer having a radically polymerizable unsaturated group in the molecule, for example, an epoxy (meth)acrylate-based oligomer, an urethane (meth)acrylate-based oligomer, a polyester (meth)acrylate-based oligomer, a polyether (meth)acrylate-based oligomer, a caprolactone-based urethane (meth)acrylate, and a polycaprolactone diol-based urethane (meth)acrylate.

The epoxy (meth)acrylate-based oligomer can be obtained, for example, by esterification by reacting an oxirane ring of a relatively low molecular weight bisphenol-type epoxy resin or novolac-type epoxy resin with (meth) acrylic acid. Further, there can also be used a carboxyl-modified type epoxy (meth)acrylate oligomer obtained by partially modifying this epoxy (meth)acrylate-based oligomer with a dibasic carboxylic acid anhydride.

The urethane (meth)acrylate-based oligomer can be obtained, for example, by esterifying a polyurethane oligomer with (meth)acrylic acid, the polyurethane oligomer being obtained by a reaction of a polyether polyol or a polyester polyol with a polyisocyanate.

The polyester (meth)acrylate-based oligomer can be obtained by esterifying hydroxyl groups of a polyester oligomer with (meth)acrylic acid, the polyester oligomer being obtained by condensation of a polybasic carboxylic acid and a polyhydric alcohol and having hydroxyl groups at both ends, or by esterifying terminal hydroxyl groups of an oligomer with (meth)acrylic acid, the oligomer being obtained by addition of an alkylene oxide to a polybasic carboxylic acid. The polyether (meth)acrylate-based oligomer can be obtained by esterifying hydroxyl groups of a polyether polyol with (meth)acrylic acid.

The caprolactone-based urethane(meth)acrylate can be obtained by a reaction of a caprolactone-based polyol, an organic isocyanate, and a hydroxy (meth)acrylate. As the caprolactone-based polyol, a commercial product can be used and there may be mentioned one having preferably two hydroxyl groups and a number-average molecular weight of preferably 500 to 3000, more preferably 750 to 2000. Further, polyols other than the caprolactone-based one, for example, ethylene glycol, diethylene glycol, 1,4-butanediol, 1,6-hexanediol, and the like may be used singly or by mixing a plurality thereof in an arbitrary ratio.

As the organic polyisocyanate, preferable is a diisocyanate having two isocyanate groups and, from the viewpoint of suppressing yellowing, there may be preferably mentioned isophorone diisocyanate, hexamethylene diisocyanate, 4,4'-dicyclohexylmethane diisocyanate, trimethylhexamethylene diisocyanate, and the like. Furthermore, as the hydroxy (meth)acrylate, there may be preferably mentioned 2-hydroxyethyl (meth)acrylate, 2-hydroxypropyl (meth)acrylate, caprolactone-modified 2-hydroxyethyl (meth)acrylate, and the like.

The caprolactone-based urethane acrylate can be synthesized by a reaction of these polycaprolactone-based polyols, an organic polyisocyanate, and a hydroxy (meth)acrylate. As a synthetic method, preferable is a method where a polycaprolactone-based polyol and an organic polyisocyanate are reacted to yield a polyurethane prepolymer having —NCO groups (isocyanate groups) at both ends and, thereafter, this is reacted with a hydroxy (meth)acrylate. The reaction condition and the like should follow a common procedure.

As the caprolactone diol-based urethane acrylate, especially preferable is one obtained by using polycaprolactone and diethylene glycol together as the polycaprolactone-based polyol, isophorone diisocyanate as the organic diisocyanate, and 2-hydroxyethyl (meth)acrylate as the hydroxy (meth)acrylate.

Furthermore, as the polymerizable oligomer, there are also a highly hydrophobic polybutadiene (meth)acrylate-based oligomer having (meth)acrylate groups as side chains of a polybutadiene oligomer; a silicone (meth)acrylate-based oligomer having a polysiloxane bond in the main chain; an aminoplast resin (meth)acrylate-based oligomer obtained by modifying an aminoplast resin having many reactive groups within a small molecule; an oligomer having cationically polymerizable functional groups in a molecule such as a novolac-type epoxy resin, a bisphenol-type epoxy resin, an aliphatic vinyl ether, an aromatic vinyl ether, and the like; and the like.

When an ultraviolet light-curable resin composition is used as the ionizing radiation-curable resin composition, it is desirable that a photopolymerization initiator is added in an amount of about 0.1 to 5 parts by mass relative to 100 parts by mass of the resin composition. The photopolymerization initiator can be selected from those which have heretofore been commonly used and is not particularly limited. For example, there may be preferably mentioned benzophenone-based, acetophenone-based, phenylketone-based, benzophenone-based, and anthraquinone-based photopolymerization initiators, and the like.

Further, as a photosensitizer, there may be used, for example, a p-dimethylbenzoic acid ester, tertiary amines, a thiol-based sensitizer, and the like.

<Additive>

Into the ionizing radiation-curable resin composition of the present invention, various additives can be blended depending on the desired physical properties of the surface-protecting layer to be formed. The additives include, for example, a weather resistance improver, an abrasion resistance enhancer, a polymerization inhibitor, a cross-linking agent, an infrared absorber, an antistatic agent, an adhesion enhancer, a levelling agent, a thixotropy-imparting agent, a coupling agent, a plasticizer, an antifoaming agent, a filler, a solvent, a colorant, and the like.

The weather resistance improver preferably contains at least either one of an ultraviolet absorber and a light stabilizer. As the ultraviolet absorber and the light stabilizer, there can be used the same ones as those described regarding the primer layer 4. The light stabilizer may be a reactive light stabilizer which has reactivity.

The content of the ultraviolet absorber relative to 100 parts by mass of the resin content which forms the surface-protecting layer is preferably 0.1 to 20 parts by mass, more preferably 0.5 to 10 parts by mass, and even more preferably 1 to 5 parts by mass. Further, the content of the light stabilizer relative to 100 parts by mass of the resin content which forms the surface-protecting layer is preferably 0.05 to 20 parts by mass, more preferably 0.1 to 10 parts by mass, and even more preferably 0.5 to 5 parts by mass.

By blending at least either one of the ultraviolet absorber and the light stabilizer as the weather resistance improver in the blending amount described above, it becomes possible to improve resistance of the colored ink layer 3 and the base material 2 against degradation and discoloration caused by ultraviolet light and the like.

<Method of Forming Surface-Protecting Layer>

When forming a surface-protecting layer, a coating agent is prepared by mixing homogeneously a polymerizable monomer which is an electron beam-curable component, a polymerizable oligomer, and various additives, each in a predetermined ratio, into an ionizing radiation-curable resin composition. The viscosity of the coating agent should be such that an uncured resin layer can be formed on the surface of the base material by the after-mentioned coating system and is not particularly limited.

The thus prepared coating agent is coated on the primer layer, so that the thickness thereof after curing becomes 1 to 20 μm, by a heretofore known system such as gravure coating, bar coating, roll coating, reverse roll coating, comma coating, and the like, preferably by gravure coating, to form an uncured resin layer.

The preferable film thickness after curing is suitably determined in a range of 1 to 20 depending on the kind of the resin composition which forms the surface-protecting layer.

The uncured resin layer formed as mentioned above is irradiated with an electron beam to cure the uncured resin layer. An accelerating voltage of the electron beam can be selected suitably depending on the kind or thickness of the resin composition which forms the surface-protecting layer but is preferably set at about 70 to 300 kV.

In electron beam irradiation, transmission ability increases with higher accelerating voltage. Therefore, when a base material which is deteriorated by an electron beam is used, it is preferable to select the accelerating voltage so that the transmission depth becomes equal to the thickness of the resin layer. By this, it becomes possible to prevent excessive electron beam to be irradiated on the base material and minimize deterioration of the base material due to the excessive electron beam. The amount of electron beam irradiation is preferably the amount with which the crosslink density of the uncured resin layer which forms the surface-protecting layer becomes saturated and is usually selected in a range of 5 to 300 kGy.

The electron beam source is not particularly limited. For example, there can be used an electron beam accelerator of Cockloft-Walton type, van de Graaff type, resonance transformer type, insulated core transformer type, linear type, Dynamitron type, high frequency type, and the like.

To the thus formed surface-protecting layer, there can also be added various additives to impart various functions such as, for example, a so-called hard coat function having high hardness and abrasion resistance, an anti-fog coating function, an anti-foul coating function, an anti-dazzle coating function, an anti-reflection coating function, an ultraviolet-shield coating function, an infrared-shield coating function, and the like.

In the present invention, elongation of the cured product of the ionizing radiation-curable resin composition, which forms the thus formed surface-protecting layer, according to JIS K6732 requires to be 1% or more. JIS K6732 ordinarily specifies a test method for a polyvinyl chloride film for agricultural use. However, in the present Examples, elongation of the cured product of the ionizing radiation-curable resin composition which forms the surface-protecting layer 5 is specified by a value measured according to a method specified in JIS K6732.

When elongation of the cured product is less than 1%, bending workability among the secondary workability decreases, and cracking and whitening occur at the bent portion. Furthermore, when elongation exceeds 400%, stiffness of the surface-protecting layer decreases.

In a weather resistance test where an ultraviolet irradiation test and a rainfall test are repeatedly performed, when the ultraviolet irradiation test (luminance: 60 mW/cm$^2$, black panel temperature: 63° C., and humidity inside the vessel: 50% RH) for 20 hours and the rainfall test (dew condensation condition (luminance: 0 mW/cm$^2$, black panel temperature: 30° C., and humidity inside the vessel: 98% RH) for 4 hours and a water atomization condition (30 seconds before and after the dew condensation condition)) as one cycle are carried out repeatedly, the decorative sheet is applicable as an interior material such as a wall, a ceiling, and the like if the time (hour) until a change in appearance such as cracking and whitening appear on the surface of the decorative sheet is 200 hours or more; the sheet is applicable as a semi-exterior material such as an eaves plate when the above time is 400 hours or more; and the sheet is applicable as an exterior material for buildings when the above time is 800 hours or more.

[Decorative Metal Plate]

The decorative sheet can be used singly as a laminating material and a wrapping material. In addition, the decorative sheet constitutes a decorative metal sheet by being pasted on a metal plate comprising a metallic material such as iron, aluminum, copper, and the like. An adhesive or a pressure-sensitive adhesive used to paste the metallic material and the decorative sheet is not particularly limited and an adhesive or a pressure-sensitive adhesive heretofore known in the field of decorative sheet can be used.

That is, the decorative metal plate comprises a metal plate, an adhesive layer disposed on a surface of the metal plate, and a decorative sheet in this order, the decorative sheet being pasted on the metal plate with the adhesive layer interposed therebetween.

The metal plate may be provided with a surface treatment such as a hot-dip galvanizing treatment, an electrogalvanizing treatment, and the like. Further, the shape of the adherend is not particularly limited and may be, for example, of a flat plate, a curved plate, a polygonal column, and the like. The thickness of the metal plate is not limited but is preferably 0.2 to 2 mm. Furthermore, in order to provide the metal plate, which is an adherend, with a masking property, the metal plate may be colored directly or may be provided with a coating layer having colors or pictorial patterns formed.

Depending on the weather resistance of the decorative sheet, the above-mentioned decorative metal plate can be used, for example, as interior materials for buildings such as walls, ceilings, and the like; semi-exterior materials such as eaves plates fixed on the underside of eaves, beams of buildings, lower surfaces of projecting parts or arches, and the like; exterior materials for structures and buildings; surface materials for doors, door frames, window frames, and the like; surface materials for cornices, skirting boards, and the like; surface materials for furniture such as chests of drawers, cabinets, and the like; and the like.

EXAMPLES

Hereinafter, the present invention will be described in detail with reference to examples, but the present invention is not limited by the examples.
[Evaluation Method]
<Elongation of Surface-Protecting Layer>

Elongation of a cured product of an ionizing radiation-curable resin composition which forms the surface-protecting layer of each decorative sheet of Examples 1 to 8 and Comparative Examples 1 to 6 was measured according to JIS K6732. That is, the cured product of the ionizing radiation-curable resin composition which forms the surface-protecting layer of each decorative sheet of Examples 1 to 8 and Comparative Examples 1 to 6 was punched out into a dumbbell shape in conformity with JIS K6732 to prepare a test sheet. Elongation of this test sheet was measured by using a tensile compression testing machine (Tensilon RTC-1250A, manufactured by Orientec Co., Ltd.) in a temperature environment of 25° C. and under conditions of a tensile speed of 50 mm/min and a distance between chucks of 100 mm.
<Elongation of Decorative Sheet>

Elongation of each decorative sheet of Examples 1 to 8 and Comparative Examples 1 to 6 was measured in the following manner. That is, each decorative sheet of Examples 1 to 8 and Comparative Examples 1 to 6 was punched out into a dumbbell shape in conformity with JIS K6732 to prepare a test sheet. Elongation of this test sheet was measured by using the tensile compression testing machine under the same conditions.
<Secondary Workability>
(1) Bending Workability A bend test of metallic materials specified in JIS Z2248 was performed on a decorated metal sheet for testing obtained by pasting each decorative sheet of Examples 1 to 8 and Comparative Examples 1 to 6 on an aluminum plate having a thickness of 0.8 mm and an area of 40×40 mm at a test temperature of 25±5° C. The test method is as follows. The decorative metal plate for testing was bent by 90° by a V-block method and, thereafter, a work of bending by 180° was performed by a push bending method with interposition of a plate having the same thickness as the aluminum plate. In addition, even though JIS Z2248 is intended to specify a bend test of a metallic plate, in the present Example, the test was performed with a metal plate having a decorative sheet pasted thereon.

Hereat, cracking or whitening at the bent portion of each of the base material, the colored ink layer, the primer layer, and the surface-protecting layer were examined visually and evaluated based on the following criteria:

No cracking and whitening are confirmed at all: 1;
Almost no cracking and whitening are confirmed: 2;
Slight cracking and whitening are confirmed: 3; and
Significant cracking and whitening are confirmed; 4.

(2) Punching Workability

A punch test was performed on a decorated metal plate for testing obtained by pasting a decorative sheet of Examples 3, 4, and 6 on an aluminum plate having a thickness of 0.8 mm and an area of 40×40 mm at a test temperature of 25±5° C.

The test method is as follows.

A circle with a 10 mm diameter was punched in a decorative metal plate for testing by using a pressing machine. Hereat, the state of the cross-section of the decorative sheet at the punched portion was examined visually and evaluated based on the following criteria:

No elongation and cracking are confirmed at all on the cross-section of the decorative sheet: 1;
Almost no elongation and cracking are confirmed on the cross-section of the decorative sheet: 2; and
Elongation and cracking are confirmed on the cross-section of the decorative sheet: 3.

(3) Cutting Workability

A shearing cutting test was performed at a test temperature of 25±5° C. on a decorated metal sheet for testing obtained by pasting a decorative sheet of Examples 1 to 8 and Comparative Examples 1 to 6 on an aluminum plate having a thickness of 0.8 mm and an area of 40×40 mm.

The test method is as follows.

A decorative metal plate for testing was cut by a shearing cutting test machine.

Hereat, the state of the cross-section of the decorative sheet at the cut portion was examined visually and evaluated based on the following criteria:

No cracking and deformation are confirmed at all on the cross-section of the decorative sheet: 1;
Almost no cracking and deformation are confirmed on the cross-section of the decorative sheet: 2; and
Cracking and deformation are confirmed on the cross-section of the decorative sheet: 3.

<Weather Resistance>

Each decorative sheet of Examples 1 to 8 and Comparative Examples 1 to 6 was subjected repeatedly to an ultraviolet irradiation test and a rainfall test using a weather resistance testing apparatus ("Eyesuper UV tester," manufactured by Iwasaki Electric Co., Ltd.) and the time (hour) elapsed until changes in appearance such as cracking, whitening, and the like occurred on the surface of the decorative sheet was measured. In addition, a combination of the weather resistance test (luminance: 60 mW/cm$^2$, black panel temperature: 63° C., and humidity inside the vessel: 50% RH) for 20 hours and the rainfall test (dew condensation condition (luminance: 0 mW/cm$^2$, black panel temperature: 30° C., and humidity inside the vessel: 98% RH) for 4 hours and a water atomization condition (30 seconds before and after the dew condensation condition)) was considered to be one cycle.

When the result of the weather resistance test was 200 hours or more, which shows that a material is applicable as an interior material for walls and ceilings, the decorative sheet was judged to be acceptable.

<Fire Resistance>

A decorative metal plate for testing obtained by pasting each decorative sheet of Examples 1 to 8 and Comparative Examples 1 to 6 on an aluminum plate was subjected to the Steiner tunnel fire test in conformity with ASTM E-84 and, based on the values of Fire Spread Index (FSI) and Smoke Development Index (SDI), was classified into Class A, Class B, and others:

Class A (FSI≤25, SDI≤450): 1;
Class B (26≤FSI≤75, SDI≤450): 2; and
Others (FSI≥76): 3.

<Abrasion Resistance>

Abrasion resistance was tested by placing steel wool (#0000) in contact with each decorative sheet of Examples 1 to 8 and Comparative Examples 1 to 6 and abrading the sheet to and fro ten times under an applied load of 1.5 kg. Thereafter, the surface of the decorative sheet was examined visually and evaluated based on the following criteria:

Almost no change was observed in the appearance: 1;
Some scratching or color change was observed in the appearance: 2; and
Significant scratching or color change was observed: 3.

<Solvent Resistance>

Solvent resistance was evaluated in the following manner. A weight of 1.5 kg, to which was attached gauze soaked with methyl ethyl ketone with a rubber band, was moved to and fro fifty times on a surface of each decorative sheet of Examples 1 to 8 and Comparative Examples 1 to 6. Thereafter, the surface of the decorative sheet was examined visually and evaluated based on the following criteria:

Almost no change was observed in the appearance of the sheet surface: 1;
Some change was observed in the appearance of the sheet surface but was practically no problem: 2; and
Significant change was observed in the appearance of the sheet surface: 3.

<Stain Resistance>

On a surface of each decorative sheet of Examples 1 to 8 and Comparative Examples 1 to 6, a staining substance in conformity with NEMA LD3 was coated and was wiped out after 24 hours by the following method. As the staining substance, there were selected distilled water, ethanol-water, acetone, ammonia, 10% aqueous citric acid, vegetable cooking oil, coffee, black tea, ketchup, mustard, 10% aqueous iodine solution, stamp ink (violet), #2 pencil, crayon, and shoe polish. When the substance could be wiped out by the following wiping method, the points were added and the total point was evaluated based on the following criteria. The higher total point shows the worse staining resistance.

(Wiping Method)

Could be wiped out with a damp or dry cloth: 0 point;
Could be wiped out with a damp or dry cloth under an applied load (1 kg); 1 point;
Could be wiped out with a common cleaner: 2 points;
Could be wiped out with a nail polish cleaner: 3 points;
Could be wiped out with a hypochlorite bleaching solution: 4 points;
Could not be wiped out with any of the above: 5 points.

(Evaluation of Stain Resistance)

Total point is 0 to 15 points: 1;
Total point is 16 to 25 points: 2;
Total point is 26 to 50 points: 3; and
Total point is 51 or more points: 4;

<Pencil Hardness>

A pencil hardness test was performed in conformity with ASTM D3363 on each decorative sheet of Examples 1 to 8 and Comparative Examples of 1 to 6. The load was set at 500 g. A scratch or a dent on the surface of the decorative sheet after the test was examined visually. The result was expressed by the highest hardness with which no scratch nor dent was formed.

EXAMPLES, COMPARATIVE EXAMPLES

Example 1

As a base material 2, there was used a film A1 having a thickness of 25 μm. On one surface of this film A1, a colored ink layer having a colored masking layer and a pictorial pattern layer was printed and, thereafter, on the pictorial pattern layer, the after-mentioned resin composition was coated to form a primer layer so that its thickness after curing became 3 μm. Subsequently, on the primer layer, an ionizing radiation-curable resin composition B1 was coated by a gravure direct coater method so that its thickness after curing became 5 μm. After coating, the ionizing radiation-curable resin composition B1 was cured by irradiation of an electron beam having an accelerating voltage of 90 kV and an exposure dose of 50 kGy (5 Mrad) to form the surface-protecting layer 5.

The film A1 is a biaxially stretched polyethylene terephthalate film (trade name "E 5007," produced by Toyobo Co., Ltd.) provided with a corona discharge treatment on the surface and the rear surface before printing the colored ink layer.

The resin composition which forms the primer layer is one obtained by blending 100 mass parts of a polycarbonate-based urethane-acryl copolymer wherein a mass ratio of a urethane component and an acrylic component is 70/30, 13 parts by mass of a hydroxyphenyl-triazine-based ultraviolet absorber 1, 17 parts by mass of a hydroxyphenyl-triazine-based ultraviolet absorber 2, 8 parts by mass of a hindered amine-based light stabilizer 1, and 7 parts by mass of hexamethylene diisocyanate as a curing agent.

Further, as the hydroxyphenyl-triazine-based ultraviolet absorber 1, there was used a reaction product (trade name "TINUVIN 400," produced by BASF) of 2-(4,6-bis(2,4-dimethylphenyl)-1,3,5-triazine-2-yl)-5-hydroxyphenyl and an oxirane {[($C_{10}$-$C_{16}$, mainly $C_{12}$-$C_{13}$ alkyloxy)methyl] oxirane}.

Furthermore, as the hydroxyphenyl-triazine-based ultraviolet absorber 2, there was used 2-(2-hydroxy-4-[1-octyloxycarbonylethoxy]phenyl)-4,6-bis(4-phenylphenyl)-1,3,5-triazine (trade name "TINUVIN 479," produced by BASF).

In addition, as the hindered amine-based light stabilizer 1, there was used bis(2,2,6,6-tetramethyl-1-(octyloxy)-4-piperidinyl) decanedioate and a reaction product of 1,1-dimethylethyl hydroperoxide and octane (trade name "TINUVIN 123," produced by BASF).

The ionizing radiation-curable resin composition B which forms the surface-protecting layer is one obtained by blending 100 parts by mass of a caprolactone-based urethane acrylate (trifunctional, elongation 17%), 3 parts by mass of a hydroxyphenyl-triazine-based ultraviolet absorber 2, and 3 parts by mass of a hindered amine-based light stabilizer 2 having an electron beam-reactive functional group.

As the hindered amine-based light stabilizer 2 having an electron beam-reactive functional group, there was used 1,2,2,6,6-pentamethyl-4-piperidinyl methacrylate (trade name "Sanol LS-3410," produced by BASF).

Example 2

A decorative sheet was prepared in the same manner as in Example 1 except that a film A2 having a thickness of 38 μm was used as the base material 2. The film A2 is a biaxially stretched polyethylene terephthalate film (trade name "G900 E38," produced by Mitsubishi Plastics, Inc.) and has been subjected to an easy adhesion coating treatment.

Example 3

A decorative sheet was prepared in the same manner as in Example 1 except that a film A3 having a thickness of 40 μm was used as the base material 2. The film A3 is a biaxially stretched polyethylene terephthalate film (trade name "Z010 E40," produced by Mitsubishi Plastics, Inc.) and has been subjected to an easy adhesion coating treatment.

Example 4

A decorative sheet was prepared in the same manner as in Example 1 except that a film A4 having a thickness of 45 μm was used as the base material 2. The film A4 is a biaxially stretched polyethylene terephthalate film (trade name "Z210 E45," produced by Mitsubishi Plastics, Inc.) and has been subjected to an easy adhesion coating treatment.

Example 5

A decorative sheet was prepared in the same manner as in Example 1 except that a film A5 having a thickness of 75 μm was used as the base material 2.

The film A5 is a biaxially stretched polyethylene terephthalate film (trade name "E 5100," produced by Toyobo Co., Ltd.) provided with a corona discharge treatment on the surface and the rear surface before printing the colored ink layer.

Example 6

A decorative sheet was prepared in the same manner as in Example 1 except that a film A4 having a thickness of 45 μm was used as the base material 2 and that an ionizing radiation-curable resin composition B2 was used as the resin composition which formed the surface-protecting layer 5. In addition, the ionizing radiation-curable resin composition B2 was coated so that its thickness after curing became 10 μm.

The ionizing radiation-curable resin composition B2 is one obtained by blending 100 mass parts of a polycaprolactonediol-based urethane acrylate (bifunctional, elongation 40%), 3 parts by mass of a hydroxyphenyltriazine-based ultraviolet absorber 2 (trade name "TINUVIN 479," produced by BASF), and 3 parts by mass of a hindered amine-based light stabilizer 2 (trade name "Sanol LS-3410," produced by BASF) having an electron beam-reactive functional group.

Example 7

A decorative sheet was prepared in the same manner as in Example 1 except that a film A4 having a thickness of 45 μm was used as the base material 2 and that an ionizing radiation-curable resin composition B3 was used as the resin composition which formed the surface-protecting layer.

The ionizing radiation-curable resin composition B3 is one obtained by blending 100 parts by mass of a resin composition (elongation 4%) containing a bifunctional polyester-based urethane acrylate and hexafunctional urethane acrylate in a mass ratio of 65/35, 1 part by mass of a hydroxyphenyltriazine-based ultraviolet absorber 2 ("TINUVIN 479," produced by BASF), and 0.3 part by mass of a hindered amine-based light stabilizer 1 (trade name "TINUVIN 123," produced by BASF).

Example 8

A decorative sheet was prepared in the same manner as in Example 1 except that a film A4 having a thickness of 45 μm was used as the base material 2 and that an ionizing radiation-curable resin composition B4 was used as the resin composition which formed the surface-protecting layer 5.

The ionizing radiation-curable resin composition B4 is one obtained by blending 100 mass parts of a resin composition (elongation 4%) containing a bifunctional polyester-based urethane acrylate and a hexafunctional urethane acrylate in a mass ratio of 65/35, and 0.7 part by mass of a hydroxyphenyltriazine-based ultraviolet absorber 2 (trade name "TINUVIN 479," produced by BASF).

Comparative Example 1

A decorative sheet was prepared in the same manner as in Example 1 except that a film A4 having a thickness of 45 μm was used as the base material 2, that a thermosetting resin composition C1 was used the resin composition which formed the surface-protecting layer 5, and that a primer layer was not formed. Further, the thermosetting resin composition C1 was coated so that its thickness after curing became 10 μm. The thermosetting resin composition C1 contains 15 parts by mass of hexamethylene diisocyanate as a hardener relative to 100 parts by mass of an acrylpolyol (elongation 0.3%).

Comparative Example 2

A decorative sheet was prepared in the same manner as in Example 1 except that a film A4 having a thickness of 45 μm was used as the base material 2 and that an ionizing radiation-curable resin composition B5 was used as the resin which formed the surface-protecting layer. The ionizing radiation-curable resin composition B5 is one obtained by blending 100 parts by mass of a hexafunctional urethane acrylate (elongation 0.5%), 0.7 part by mass of a hydroxyphenyltriazine-based ultraviolet absorber 2 (trade name "TINUVIN 479," produced by BASF), and 4 parts by mass of a hindered amine-based light stabilizer 2 (trade name "Sanol LS-3410," produced by BASF).

Comparative Example 3

A decorative sheet was prepared in the same manner as in Example 1 except that a film A5 having a thickness of 12 μm was used as the base material 2.

Comparative Example 4

A decorative sheet was prepared in the same manner as in Example 1 except that a film A5 having a thickness of 100 μm was used as the base material 2.

Comparative Example 5

A decorative sheet was prepared in the same manner as in Example 1 except that a film A6 having a thickness of 80 μm was used as the base material 2 and the ionizing radiation-curable resin composition B1 was coated so that its thickness after curing became 10 μm. The film A6 is a polypropylene resin film (trade name "ARTPLY," produced by Mitsubishi Plastics, Inc.) and has been subjected to an easy adhesion coating treatment.

Comparative Example 6

A decorative sheet was prepared in the same manner as in Example 1 except that a film A7 having a thickness of 150 μm was used as the base material 2, that a thermosetting resin composition C2 was used as the resin composition which formed the surface-protecting layer 5, and the thermosetting resin composition C2 was coated so that its thickness became 10 μm, and that a primer layer was not formed. The film A7 is a polyvinyl chloride resin film (trade name "SHF BW-201," produced by Bando Chemical Ind., Ltd.) and has been subjected to an easy adhesion coating treatment. The thermosetting resin composition C2 contains 15 parts by mass of hexamethylene diisocyanate relative to 100 parts by mass of a urethane alkyd (elongation 20%).

[Evaluation Results]

The results evaluated based on the evaluation methods described above are shown in Table 1.

TABLE 1

| | | | Example 1 | Example 2 | Example 3 | Example 4 | Example 5 | Example 6 | Example 7 | Example 8 |
|---|---|---|---|---|---|---|---|---|---|---|
| Base material | Type of film | | A1 | A2 | A3 | A4 | A5 | A4 | A4 | A4 |
| | Thickness (μm) | | 25 | 38 | 40 | 45 | 75 | 45 | 45 | 45 |
| | Primer layer | | Present | Present | Present | Present | Present | Present | Present | Present |
| Surface-protecting layer | Type of resin composition | | B1 | B1 | B1 | B1 | B1 | B2 | B3 | B4 |
| | Ultraviolet absorber 2 | | 3 | 3 | 3 | 3 | 3 | 3 | 1 | 0.7 |
| | Light stabilizer 1 | | 0 | 0 | 0 | 0 | 0 | 0 | 0.3 | 0 |
| | Light stabilizer 2 | | 3 | 3 | 3 | 3 | 3 | 3 | 0 | 0 |
| | Thickness (μm) | | 5 | 5 | 5 | 5 | 5 | 10 | 5 | 5 |
| | Percentage elongation | | 17 | 17 | 17 | 17 | 17 | 40 | 4 | 4 |
| Evaluation item | Decorative sheet-degree of elongation at break (%) | MD | 47.2 | 170 | 68.3 | 55.7 | 55.8 | 60.4 | 67.4 | 67.4 |
| | | CD | 43 | 165 | 42.3 | 40.7 | 48.6 | 42.8 | 36.5 | 36.5 |
| | Bending workability | Cracking of base material | 2 | 2 | 2 | 2 | 2 | 2 | 2 | 2 |
| | | Cracking of primer layer and surface-protecting layer | 2 | 1 | 2 | 2 | 2 | 1 | 2 | 2 |
| | | Cracking of colored ink layer | 2 | 1 | 2 | 2 | 2 | 2 | 2 | 2 |

TABLE 1-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Punching workability | | — | — | 1 | 1 | — | 1 | — | — |
| Cutting workability | | 1 | 1 | 1 | 1 | 1 | 1 | 1 | 1 |
| Weather resistance (time, hour) | | 1000 | 1000 | 1000 | 1000 | 1000 | 1000 | 400 | 200 |
| Fire resistance | | 1 | 1 | 1 | 1 | 1 | 1 | 1 | 1 |
| Abrasion resistance | | 1 | 1 | 1 | 1 | 1 | 1 | 1 | 1 |
| Solvent resistance | | 1 | 1 | 1 | 1 | 1 | 1 | 1 | 1 |
| Stain resistance | | 2 | 2 | 2 | 2 | 2 | 2 | 2 | 1 |
| Pencil hardness | | B~2B | B | B | B | H | B~2B | B | F~H |

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Base material | Type of film | | A4 | A4 | A5 | A5 | A6 | A7 |
|  | Thickness (μm) | | 45 | 45 | 12 | 100 | 80 | 150 |
|  | Primer layer | | Absent | Present | Present | Present | Present | Absent |
| Surface-protecting layer | Type of resin composition | | C1 | B5 | B1 | B1 | B1 | C2 |
|  | Ultraviolet absorber 2 | | 0 | 0.7 | 3 | 3 | 3 | 0 |
|  | Light stabilizer 1 | | 0 | 0 | 0 | 0 | 0 | 0 |
|  | Light stabilizer 2 | | 0 | 4 | 3 | 3 | 3 | 0 |
|  | Thickness (μm) | | 10 | 5 | 5 | 5 | 5 | 10 |
|  | Percentage elongation | | 0.3 | 0.5 | 17 | 17 | 17 | 20 |
| Evaluation item | Decorative sheet- degree of elongation at break (%) | MD | 51.5 | 49.5 | 24.2 | 58.2 | 864 | 214 |
|  |  | CD | 39.3 | 51.6 | 29 | 46 | 768 | 233 |
|  | Bending workability | Cracking of base material | 2 | 2 | 4 | 2 | 1 | 1 |
|  |  | Cracking of primer layer and surface-protecting layer | 4 | 4 | 4 | 2 | 4 | 1 |
|  |  | Cracking of colored ink layer | 4 | 4 | 4 | 2 | 4 | 1 |
|  | Punching workability | | — | — | — | — | — | — |
|  | Cutting workability | | 1 | 1 | 1 | 2 | 2 | 3 |
|  | Weather resistance (time, hour) | | 50 | 200 | 1000 | 1000 | 800 | 50 |
|  | Fire resistance | | 1 | 1 | 1 | 2 | 2 | 1 |
|  | Abrasion resistance | | 2 | 1 | 1 | 1 | 1 | 3 |
|  | Solvent resistance | | 1 | 1 | 1 | 1 | 1 | 3 |
|  | Stain resistance | | 3 | 1 | 2 | 2 | 2 | 3 |
|  | Pencil hardness | | F~H | F~H | 2B~3B | F | 2B~3B | 2B~3B |

As shown in Table 1, enhancement of fire resistance is seen when a biaxially stretched polyethylene terephthalate film having a thickness of less than 100 μm is used as the base material. Furthermore, when the resin composition B1, B2, B3, or B4, the cured product of which shows elongation of 1% or more, is used as the resin composition which forms the surface-protecting layer, workability is improved compared to a case where the resin composition B5 or C1 is used.

Further, when the resin composition B1, B2, B3, or B4 is used as the resin composition which forms the surface-protecting layer, weather resistance is improved compared to a case where the resin composition B4, C1, or C2 is used.

As described above, the decorative sheets of Examples 1 to 8, wherein biaxially stretched polyethylene terephthalate film were used as the base material and, at the same time, the thickness of the base material was set at 25, 38, 40, 45, or 75 μm, and wherein the resin composition B1, B2, B3, or B4, the cured product of which showed elongation of 1% or more, was used as the resin composition which formed the surface-protecting layer, were found to be better in all of workability, weather resistance, and fire resistance than the decorative sheets of Comparative Examples 1 to 6.

DESCRIPTION OF SYMBOLS

1: Decorative sheet, 2: Base material, 3: Colored ink layer, 4: Primer layer, and 5: Surface-protecting layer.

The invention claimed is:

1. A decorative metal plate, comprising:

a metal plate, an adhesive layer disposed on a surface of the metal plate, and a decorative sheet in this order, the decorative sheet being adhered to the metal plate with the adhesive layer interposed therebetween, wherein the decorative sheet comprises:

a base material, a colored ink layer, a single primer layer directly in contact with the colored ink layer, and a surface-protecting layer in this order, wherein the base material comprises a polyester-based film wherein a thickness of the base material is 20 μm or more but 95 μm or less;

the primer layer comprises at least one selected from the group consisting of a polycarbonate-based urethane-acrylic copolymer, a polyester-based urethane-acrylic copolymer and a resin comprising a polycarbonate-based urethane-acrylic copolymer and an acrylic polyol;

the surface-protecting layer comprises a cured product of an ionizing radiation-curable resin composition comprising polymerizable compounds, wherein the polymerizable compounds consist of at least one polymerizable oligomer selected from the group consisting of a caprolactone-based urethane (meth)acrylate and a caprolactone diol-based urethane (meth)acrylate, wherein elongation of the cured product according to JIS K6732 is 1% or more; and wherein elongation of the decorative sheet according to JIS K6732 is 30% or more but 180% or less.

2. The decorative metal plate according to claim 1, wherein the base material comprises biaxially stretched polyethylene terephthalate.

3. The decorative metal plate according to claim 1, wherein the surface-protecting layer contains at least either one of a triazine-based ultraviolet absorber and a light stabilizer.

4. The decorative metal plate according to claim 1, wherein the primer layer contains at least either one of a triazine-based ultraviolet absorber and a light stabilizer.

5. The decorative metal plate according to claim 1, wherein the primer layer contains a copolymer of a polycarbonate-based urethane resin and an acrylic resin.

6. The decorative metal plate according claim 1, wherein a thickness of the primer layer is 0.5 to 10 μm.

7. The decorative metal plate according claim 1, wherein elongation of the decorative sheet according to JIS K6732 is 40% or more but 170% or less.

8. The decorative metal plate according to claim 1, wherein a thickness of the base material is 25 μm or more but 80 μm or less.

9. The decorative metal plate according to claim 1, wherein a thickness of the base material is 30 μm or more but 50 μm or less.

10. The decorative metal plate according claim 1, wherein colored ink layer comprises at least one of a pictorial pattern layer and a color masking layer.

11. The decorative metal plate according to claim 1, wherein elongation of the cured product according to JIS K6732 is 1% or more and 400% or less.

12. An interior and exterior material for building or structure comprising the decorative metal plate according to claim 1.

* * * * *